US006628763B1

(12) United States Patent
Mani

(10) Patent No.: US 6,628,763 B1
(45) Date of Patent: Sep. 30, 2003

(54) CALL WAITING SERVICE IN MULTIMEDIA-CAPABLE NETWORK

(75) Inventor: Babu V. Mani, Plano, TX (US)

(73) Assignee: Alcatel, Paris (FR)

( * ) Notice: Subject to any disclaimer, the term of this patent is extended or adjusted under 35 U.S.C. 154(b) by 275 days.

(21) Appl. No.: 09/871,042

(22) Filed: May 31, 2001

(51) Int. Cl.$^7$ ............................................. H04M 11/00
(52) U.S. Cl. ............................. 379/93.35; 379/90.01; 379/215.01; 379/142.08
(58) Field of Search .......................... 379/93.35, 93.23, 379/93.09, 93.01, 90.01, 142.01, 142.08, 215.01, 207.15, 211.02

(56) References Cited

U.S. PATENT DOCUMENTS

| | | | | |
|---|---|---|---|---|
| 5,805,587 A | * | 9/1998 | Norris et al. ............. | 379/93.35 |
| 5,896,444 A | | 4/1999 | Perlman et al. ........... | 379/93.35 |
| 5,917,817 A | | 6/1999 | Dunn et al. ................ | 370/352 |
| 5,940,489 A | | 8/1999 | Cohn et al. ................ | 379/215 |
| 5,999,613 A | * | 12/1999 | Nabkel et al. ........... | 379/215.01 |
| 6,014,437 A | | 1/2000 | Acker et al. .............. | 379/219 |
| 6,028,917 A | | 2/2000 | Creamer et al. ........ | 379/100.01 |
| 6,104,800 A | | 8/2000 | Benson ....................... | 379/215 |
| 6,144,644 A | | 11/2000 | Bajzath et al. ............ | 370/259 |
| 6,157,640 A | | 12/2000 | Valentine ................... | 370/384 |

OTHER PUBLICATIONS

Gary Rogers, Sonus Networks; "Softswitching is the architecture for the new public network"; Feb. 19, 2001; pp. 1–4.
"Class–Independent Switching"; Tellabs; Oct. 12, 2000; pp. 1–10 (+ cover).
Janet R. Dianda, Raymond O. Colbert, Philippe J.L. Herve and Tongzeng Yang; "Programmable Service Platforms for Converged Voice/Data Services"; Bell Labs Technical Journal (Jul.–Sep., 2000) ; Aug. 2000; pp. 43–58.
"SALIX® 7620 Softswitch"; Tellabs; Jul. 2000; 4 pages.
Doug Allen; "Softswitch Fever: The Bedrock for Next–Gen Services"; Telecommunications®; Jan. 2000; pages 1–7.
"CommWorks Multiservice Architecture"; http://www.3com.com/technology/tech_net/white_papers/503087a.html; pp. 1–10.
"Carrier–Class Features and Components"; http://192.156.136.22/products/dsheets/400595a.html; pp. 1–3.

* cited by examiner

Primary Examiner—Wing Chan
(74) Attorney, Agent, or Firm—Danamraj & Youst, P.C.; Richard A. Mysliwiec; V. Lawrence Sewell

(57) ABSTRACT

A call treatment system and method in a multimedia-capable network for providing an enhanced call waiting service wherein multiple calls waiting to be serviced are accorded different treatments based on multimedia responses. When a network element serving a subscriber currently engaged in an established call connection with a party receives an indication that an incoming call is being directed towards the subscriber from at least one calling party, a multimedia session engine is invoked by the network element to launch a call treatment application for the subscriber. If the number of calls allowed to wait on the subscriber exceeds a predetermined maximum value, the incoming call is accorded a predetermined default treatment. Otherwise, the call treatment application is operable to query a subscriber profile associated with the subscriber to determine a suitable multimedia interface to be presented for effectuating a response using a browser-based interactive system.

24 Claims, 6 Drawing Sheets

CALL WAITING SERVICE IN MULTIMEDIA-CAPABLE NETWORK

CROSS-REFERENCE TO RELATED APPLICATION(S)

This application discloses subject matter related to the subject matter disclosed in the following commonly owned co-pending patent application(s): (i) "User Verification Service In A Multimedia-Capable Network," filed May 31, 2001, Ser. No.:09/871,510, in the name(s) of: Babu V. Mani; (ii) "Direct Connect Service In A Multimedia-Capable Network," filed May 31, 2001, Ser. No. 09/871,514, in the name(s) of: Babu V. Mani; (iii) "Distinctive Call Notification Service In A Multimedia-Capable Network," filed May 31, 2001, Ser. No.: 09/871,079, in the name(s) of: Babu V. Mani; (iv) "Emergency Notification And Override Service In A Multimedia-Capable Network," filed May 31, 2001, Ser. No. 09/871,515, in the name(s) of: Babu V. Mani; and (v) "Call Party Profile Presentation Service In A Multimedia-Capable Network," filed May 31, 2001, Ser. No.: 09/871,410, in the name(s) of: Babu V. Mani, which are hereby incorporated by reference for all purposes.

BACKGROUND OF THE INVENTION

1. Technical Field of the Invention

The present invention generally relates to telecommunication and data communication services. More particularly, and not by way of any limitation, the present invention is directed to a call waiting service in a multimedia-capable next-generation network.

2. Description of Related Art

Over the last two decades or so, telecommunication services have evolved rapidly from simple telephone calls and fax communications to a host of advanced services such as multi-party conferences, voice mail, call forwarding, caller ID, call waiting, et cetera. This rapid evolution has been made possible primarily due to the successful deployment of the Intelligent Network (IN) and Advanced IN (AIN) architecture using Signaling System No. 7 (SS7) as the out-of-band signaling protocol infrastructure. Similarly, data services have also followed a significant transformation from basic text messaging in the 1980s to the World Wide Web and Internet of today, where transporting diverse media has become commonplace. For example, bandwidth-intensive services such as desktop video conferencing, video on demand, telemedicine, real-time audio, and many other applications are driving the demand for simultaneous support of different types of services on the same public network.

Coupled with the phenomenal popularity of the Internet, recently there has been a tremendous interest in using the packet-switched network (PSN) infrastructure employed in the data networks (e.g., those based on Internet Protocol (IP) addressing) as a replacement for, and/or as an adjunct to, the existing circuit-switched network (CSN) infrastructure deployed in today's voice networks. Several advantages are expected to be realized due to such integration. From network operators' viewpoint, the inherent traffic aggregation in PSN allows for a reduction in the cost of transmission and the infrastructure cost per end-user. Ultimately, such cost reductions enable the network operators to pass on the savings to subscribers or, more generally, users. Also, operators of a new breed of service-centric networks (referred to as next-generation networks, distinct from the existing voice-centric and data-centric networks) can offer enhanced services with integrated voice/data/video to users who will be using endpoints of diverse multimedia capabilities.

As alluded to hereinabove, several advances have taken place in both data and voice services. However, the current data-centric and voice-centric services do not provide the gamut of enhancements that are possible with the use of multimedia capabilities in a next-generation network.

SUMMARY OF THE INVENTION

Accordingly, the present invention advantageously provides an enhanced call waiting service in a multimedia-capable network wherein one or more calls waiting to be serviced are accorded different treatments based on a number of subscriber-selectable features. Preferably, the multimedia-capable network is provisioned as a next-generation network having a decoupled service architecture that is facilitated by the use of multimedia softswitch technology.

In one aspect, the present invention is directed to a call treatment method for use in a multimedia-capable next-generation network. When a network element serving a subscriber currently engaged in an established call connection with a party receives an indication that an incoming call is being directed towards the subscriber from at least one calling party, a multimedia session engine is invoked by the network element to launch a call treatment application for the subscriber. If the number of calls allowed to wait on the subscriber exceeds a predetermined maximum value, the incoming call is accorded a predetermined default treatment. Otherwise, the call treatment application is operable to query a subscriber profile associated with the subscriber to determine a suitable multimedia interface to be presented for effectuating a response to the incoming call without disrupting the established call connection, preferably by using a browser-based interactive system.

Depending on how the service architecture is implemented, the call treatment application may be provisioned as a service application hosted on a third-party server platform coupled to a public packet-switched network (e.g., the Internet), as a telecom-hardened, carrier-class service application hosted on dedicated IN/AIN-compliant nodes such as multimedia Service Control Points (SCPs) and application servers, or as a centralized service with service logic embedded in SS7 nodes (e.g., Service Switching Points or SSPs) and multimedia softswtich elements.

In one exemplary embodiment, the call treatment application is operable to service multiple waiting calls at the same time, wherein distinct multimedia responses may be provided to each call. Preferably, stored or live audio clips, video clips, text messages, text-to-speech messages, graphics, animation, etc. can be connected to the waiting call in queue by employing a browser-based "drag-and-drop" scheme in conjunction with a multimedia intelligent terminal (either a computer-based device or a dedicated intelligent telephony station having a multimedia-based man/machine interface). In another exemplary embodiment of the present invention, the call waiting notification to the subscriber and/or the response thereto may be dependent on calling party ID or profile information, terminal capabilities, time-of-day of the incoming call, its order of arrival, etc.

In another aspect, the present invention is directed to a computer-accessible medium operable with a network element disposed in a multimedia-capable next-generation network. The computer-accessible medium is further operable to carry a sequence of instructions which, when executed by at least one processing entity associated with the network, cause to be performed at least a portion of the steps of the multimedia call waiting method set forth hereinabove.

In yet another aspect, the present invention is directed to a call treatment system for use in a multimedia-capable network. A multimedia network element is provided for serving a subscriber currently engaged in an established call connection with a party. The network element is operable to receive an indication that an incoming call is being directed to the subscriber from at least one calling party when one or more additional calls are placed to the subscriber during the established call connection. Responsive to the indication received at the network element, a multimedia session engine associated with the network element is operable to launch a call treatment application for the subscriber. Multimedia-capable service logic program infrastructure associated with the call treatment application is provided for querying a subscriber profile stored in a database to determine a suitable multimedia interface to be presented to the subscriber for effectuating a response to the incoming call. One or more video/still cameras, microphones, display screens, keyboards, pointing devices, joy sticks, track balls, voice recorders, audio-to-text or text-to-audio converters, and the like are provided for activating at least a portion of the multimedia interface by the subscriber to effectuate a multimedia response to the incoming call without disrupting the established call connection. In addition, a suitable browser interface may preferably be included for effectuating drag-and-drop interaction with respect to providing multimedia responses and for originating and/or terminating multimedia calls.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
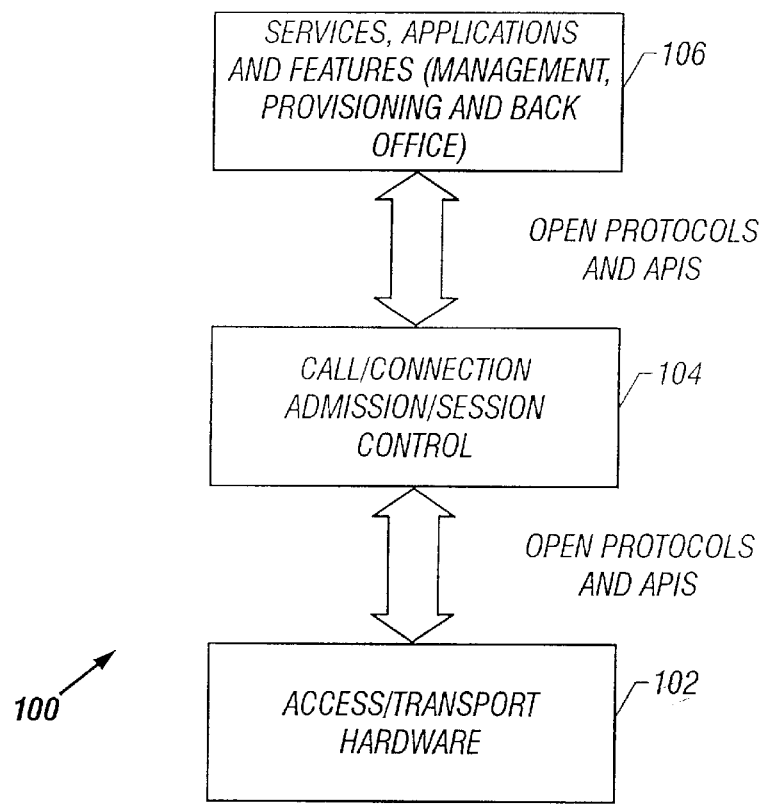
FIG. 1 depicts an exemplary high-level architectural scheme of a next-generation, multimedia-capable network employed for practicing the teachings of the present invention.

In the drawings, like or similar elements are designated with identical reference numerals throughout the several views thereof, and the various elements depicted are not necessarily drawn to scale. Referring now to FIG. 1, depicted therein is an exemplary high-level architectural scheme 100 of a next-generation network that is capable of effectuating multimedia communications. In the context of the present patent application, the term "multimedia" broadly refers to visual information, aural information, and other information. Visual information is generally divided into two categories: (i) still pictures and graphics, and (ii) full-motion video or animation. Aural information includes both speech and non-speech categories. Other information categories can include text, computer data, etc. Multimedia communication involves, accordingly, integrated presentation of text, graphics, video, animation, sound, and the like, using different media and multiple information elements in a single application or session.

The exemplary architectural scheme 100 of the next-generation network is preferably effectuated by implementing what is known as softswitch technology. Essentially, the softswitch functionality is operable to separate the call control functions of a call (or, "session control" functions in the context of a multimedia communication session) from the media gateways (i.e., transport layer(s)) that carry it. Call control features can vary, but call routing, admission control, connection control (such as creating and tearing down sessions), and signaling interworking—such as from SS7 to Session Initiation Protocol (SIP)—are usually included. These functionalities may collectively be referred to as session control. The softswitch functionality can also include: (i) the ability to route a call based on customer database information, (ii) the ability to transfer control of the call to a node disposed in another network, and (iii) support of management functions such as provisioning, billing, etc.

Continuing to refer to FIG. 1, the architectural scheme 100 accordingly includes an access/transport level 102 which interacts with a session control level 104 via a plurality of open-standard protocols and application programming interfaces (APIs). The session control level 104 is operable, in turn, to interface with an application services/features level 106 via a second set of open-standard protocols and APIs. As will be described in greater detail hereinbelow, various multimedia services, applications, and features may be provided as part of this services level 106. Also, some of the back office management and provisioning functionality can be included herewith.

Those skilled in the art should readily appreciate that several protocols and APIs are available for effectuating the architectural scheme 100 set forth hereinabove, which effectively decouples the session control layer from the underlying access/transport layer as well as the service application layer. For example, these protocols—which effectuate media control APIs, signaling APIs, and service APIs—include: SIP, H.323, Call Processing Language (CPL), Media Gateway Controller Protocol (MGCP), Internet Protocol Device Control (IPDC), H.248, MEGACO, Real-Time Protocol (RTP), Java™ APIs for Integrated Networks (JAIN), Resource Reservation Protocol (RSVP), Parlay, Lightweight Directory Access Protocol (LDAP), Markup Languages such as Extensible Markup Language (XML), Multi Protocol Label Switching (MPLS), and the like. Additionally, access to the existing IN/AIN service architecture is also available via suitable SS7 or IP-based interfaces.

The softswitch functionality is realized essentially as a software implementation that can reside on a single network element, or be distributed across multiple nodes. Also, different levels of decoupling and interfacing may be provided in an actual softswitch implementation. For example, SS7 functionality may be embedded within a softswitch element or kept separate. In other implementations, the softswitch functionality may sit on top of a media gateway (MGW), instead of being physically distinct, as long as transport and control planes are decoupled.

By creating separate planes for control and switching and leveraging software's programmability, service providers can combine transport services and control protocols freely in order to facilitate seamless migration from one service to another. Best-in-class solutions and products from multiple vendors can be advantageously deployed in the next-generation network because of open standards and APIs. Further, open APIs to the service layer (including a suitable service creation environment (SCE)), along with service creation, service mediation and service brokering standards, enable creation of numerous advanced, multimedia-enhanced services with faster service rollout.

Figure 2:
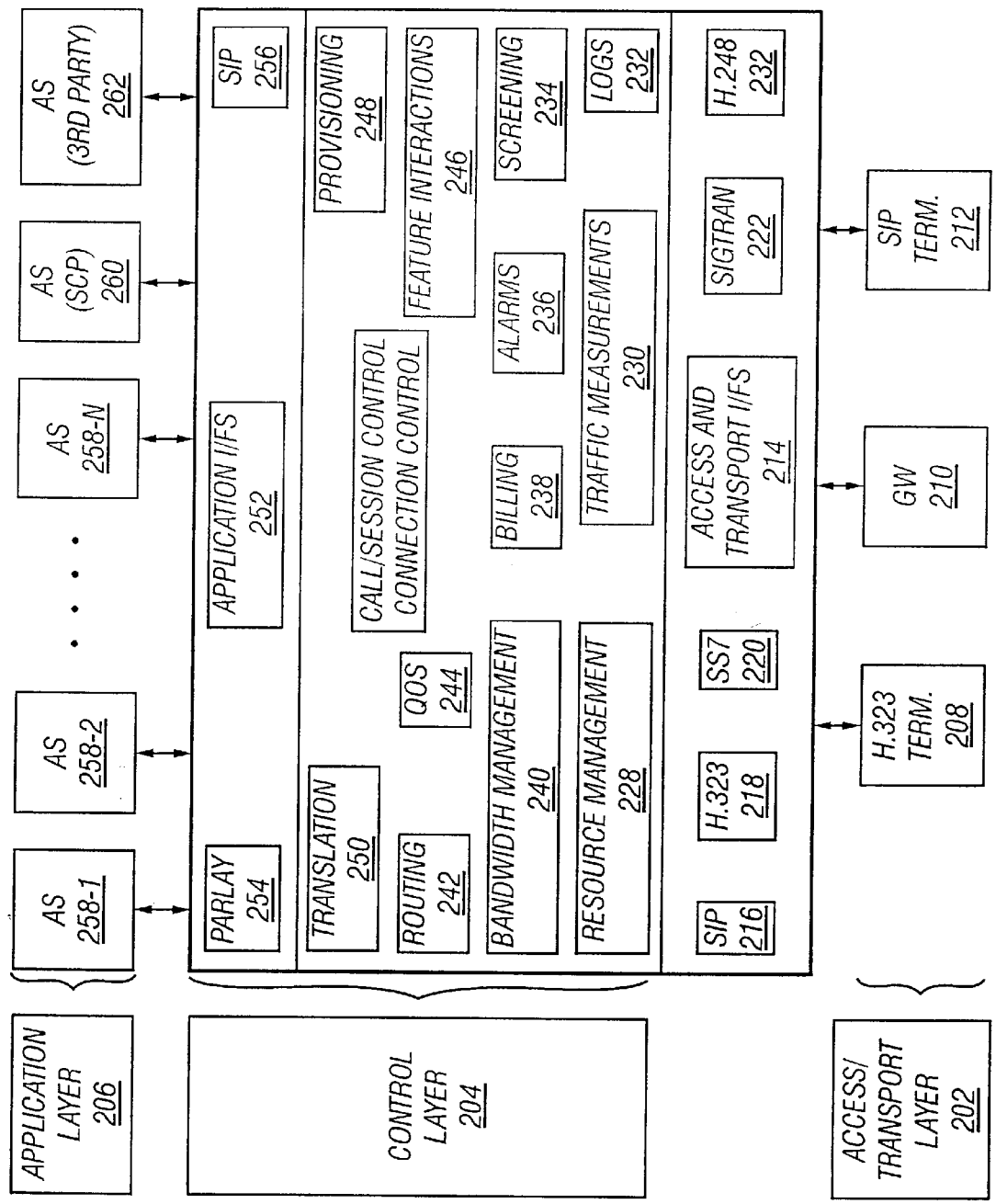
FIG. 2 depicts a functional block diagram associated with the exemplary high-level architectural scheme shown in FIG. 1.

FIG. 2 depicts a functional block diagram associated with the exemplary architectural scheme shown in FIG. 1. Three layers corresponding to the three decoupled levels of the architectural scheme are particularly illustrated. An access/transport layer 202 is exemplified with a plurality of multimedia-capable H.323 terminals 208, GWs 210 (including MGWs and Access Gateways or AGWs) for providing access to one or more Integrated Access Devices (IADs) (not shown) and other communication appliances, and multimedia-capable SIP terminals 212. For purposes of the present invention, all such multimedia-capable access devices (including multimedia-capable phones, computers, game stations, television sets, etc.) may be referred to as multimedia appliances and are preferably provided with one or more man/machine interfaces (e.g., video/still cameras, microphones, display screens, keyboards, pointing devices, joy sticks, track balls, voice recorders, audio-to-text or text-to-audio converters, and the like) for accepting or capturing multimedia responses or inputs associated with a user. Also, in some exemplary implementations, the multimedia appliances may be equipped with suitable biometric ID readers and sensors, e.g., fingerprint readers, retinal scanners, voice recognition systems, etc.

Continuing to refer to FIG. 2, control layer 204 of the decoupled architectural scheme illustrates the functionality of an exemplary multimedia call/session engine implemented as part of a multimedia softswitch in a network. A call/session and connection control block 226 is provided with a plurality of access and transport interfaces 214 to couple to the underlying access/transport layer 202. As alluded to hereinabove, these interfaces include, e.g., SIP interfaces 216, H.323 interfaces 218, SS7 interfaces 220, SigTran interfaces 222 (for SS7-over-IP) and H.248 interfaces 224. The functionality of the call/session and connection control block 226 is associated with a plurality of modules such as, for instance, a resource management module 228, a traffic metering/measurement module 230, an event log module 232, a screening module 234, alarms 236, a billing module 238, a bandwidth management module 240, a routing module 242, a Quality of Service (QoS) module 244, feature interactions module 246, a provisioning module 248, and a translation module 250.

A plurality of application interfaces 252 are available to the multimedia session engine for interacting with an application layer 206. A Parlay interface 254 and a SIP interface 256 are exemplified herein. Reference numerals 258-1 through 258-N refer to a plurality of application servers (ASs) that are operable to host various services, features and management policies. One or more legacy service nodes (e.g., a Service Control Point or SCP) may also be provided as part of the application layer 206 in the form of one or several AS nodes, e.g., AS 260. Preferably, interfaces to third-party AS nodes 262 are also included.

Application layering in the decoupled architectural scheme can be architected in three ways. Custom applications such as e-commerce, e-business, e-residence (home appliance control, residential security, etc.), e-health, and the like, may reside on the Internet as applications hosted on third-party platforms. Specialized services such as Virtual Private Networks (VPNs), prepaid services, etc., and multimedia applications for business and residential use may be provided as distributed applications hosted on dedicated telecom-hardened platforms. Carrier-class AS nodes, multimedia-capable SCPs, etc. typically comprise such platforms. A select group of legacy service offerings, for commercial as well as residential applications, may be provided as centralized applications that are based on SS7 platforms (such as signal switching points (SSPs) and softswitch nodes.

Figure 3:
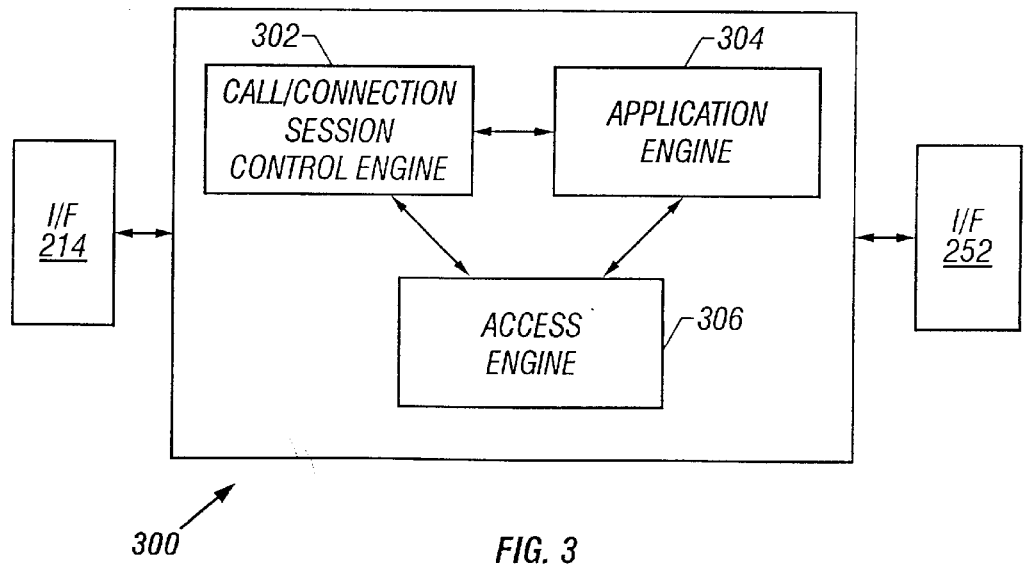
FIG. 3 depicts a functional block diagram of a multimedia call/session engine operable in accordance with the teachings of the present invention.

Referring now to FIG. 3, depicted therein is a high-level functional block diagram of a call/session engine 300 of a multimedia softswitch operable in accordance with the teachings of the present invention. As described in detail hereinabove, both access/transport interfaces 214 and application layer interfaces 252 are available to the call/session engine 300 for effectuating its softswitch functionality. A control engine 302 is responsible for call/session control and connection control (analogous to the traditional call control function or CCF). An application engine 304 is included for application triggering and managing feature/policy interaction with respect to a triggered service application. In addition, the application engine 304 is preferably operable to open suitable APIs for supporting enhanced services. When third-party applications are invoked, the application engine 304 may also provide firewall management and subscriber access management for service selection and initiation. An access engine 306 is operable to effectuate online user authentication and authorization and validate service usage rights. Also, roaming management may be provided by the access engine 306 for subscription retrieval, roaming retrieval and registration negotiation.

Figure 4:
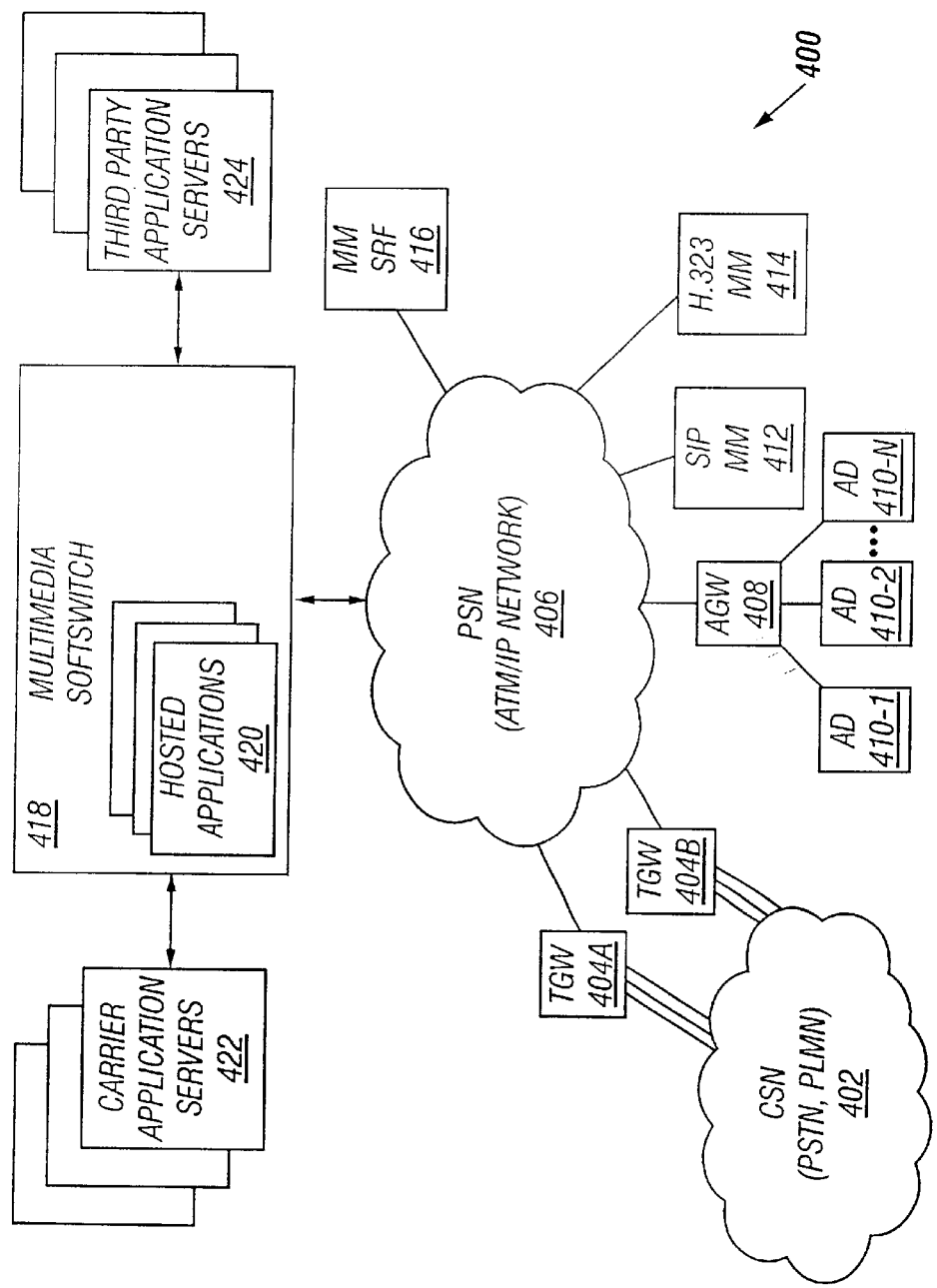
FIG. 4 depicts an exemplary next-generation network capable of multimedia services.

FIG. 4 depicts an exemplary next-generation multimedia network 400 that is capable of providing a plurality of multimedia services in accordance with the teachings of the present invention. For purposes of the present invention, network 400 and its variants and exemplary implementations will be referred to as a "service network." One or more legacy circuit-switched networks (CSNs) 402 such as the Public Switched Telephone Network (PSTN) for wireline telephony and the Public Land Mobile Network (PLMN) for wireless telephony are coupled to one or more packet-switched networks (PSNs) 406 such as the IP-based Internet, ATM-based packet network, etc. Further, the PSN portion 406 may also encompass such other private IP-based networks as, e.g., corporate intranets, enterprise networks, home networks, and the like. Accordingly, in one embodiment, PSN 406 represents an inter-networking network of a combination of such IP networks. A plurality of Trunk Gateways (TGWs), e.g., TGW 404A and TGW 404B, are disposed between the CSN and PSN portions of the network 400 for effectuating the interfacing therebetween. An Access Gateway (AGW) node 408 is coupled to the PSN portion 406 for facilitating access to the network from a plurality of access devices (ADs) 410-1 through 410-N. One or more multimedia-capable SIP terminals 412 and multimedia-capable H.323 terminals 414 are operable to originate and terminate multimedia sessions in conjunction with various multimedia services supported by the network 400.

One or more optional multimedia (MM) Service Resource Function (SRF) nodes, e.g., MM-SRF 416, are coupled to PSN 400 for providing bearer resource functionality for converged voice/data services, protocols to request these services, and open APIs for programming bearer-resource-intensive applications as well as content/announcement files. The MM-SRF node 416 does not set up a bearer path between two parties, however, as there is no such dedicated bearer connection in the context of IP networking. Rather, only a logical connection is established between the parties.

Within the multimedia-based service network framework, some of the functions of the MM-SRF node 416 include the following: (i) operating in the media access/resources plane for bearer services by providing multimedia resource services, (ii) providing standard protocols, (iii) interfacing to AS nodes through a multimedia softswitch (e.g., softswitch 418), and (iv) enabling third-party programmability of bearer services and content/announcements through the open APIs. Those skilled in the art should appreciate that some of these functionalities may be embedded within the multimedia softswitch 418 or be distributed across several MM-capable nodes depending on the integration level of the softswitch.

A plurality of hosted applications 420 are co-located at the multimedia softswitch node 418. The specific type of the applications is dependent on the service architecture implementation and application layering. Some of the exemplary applications may include network announcements (in conjunction with SRF 416), video conferencing, digit collection, unified (multimedia) messaging, media streaming and custom announcements, automatic speech recognition (ASR), text-to-speech (TTS), user verification using multimedia, and various enhanced services such as multimedia call waiting, direct connect services, distinctive call notification, emergency override service, presentation of call party profiles based on multimedia, etc. It should be recognized, in addition, that some of these multimedia services may be provisioned as applications hosted on carrier AS nodes 422 and third-party AS nodes 424, with suitable APIs associated therewith, respectively.

Although the exemplary network embodiment 400 shown in FIG. 4 does not explicitly illustrate SS7 interfaces for effectuating legacy IN/AIN services, those skilled in the art should appreciate that various such SS7 interfaces and SS7-capable signaling gateways (SGWs) may also be appropriately disposed in the network for providing SS7 functionality.

Figure 5:
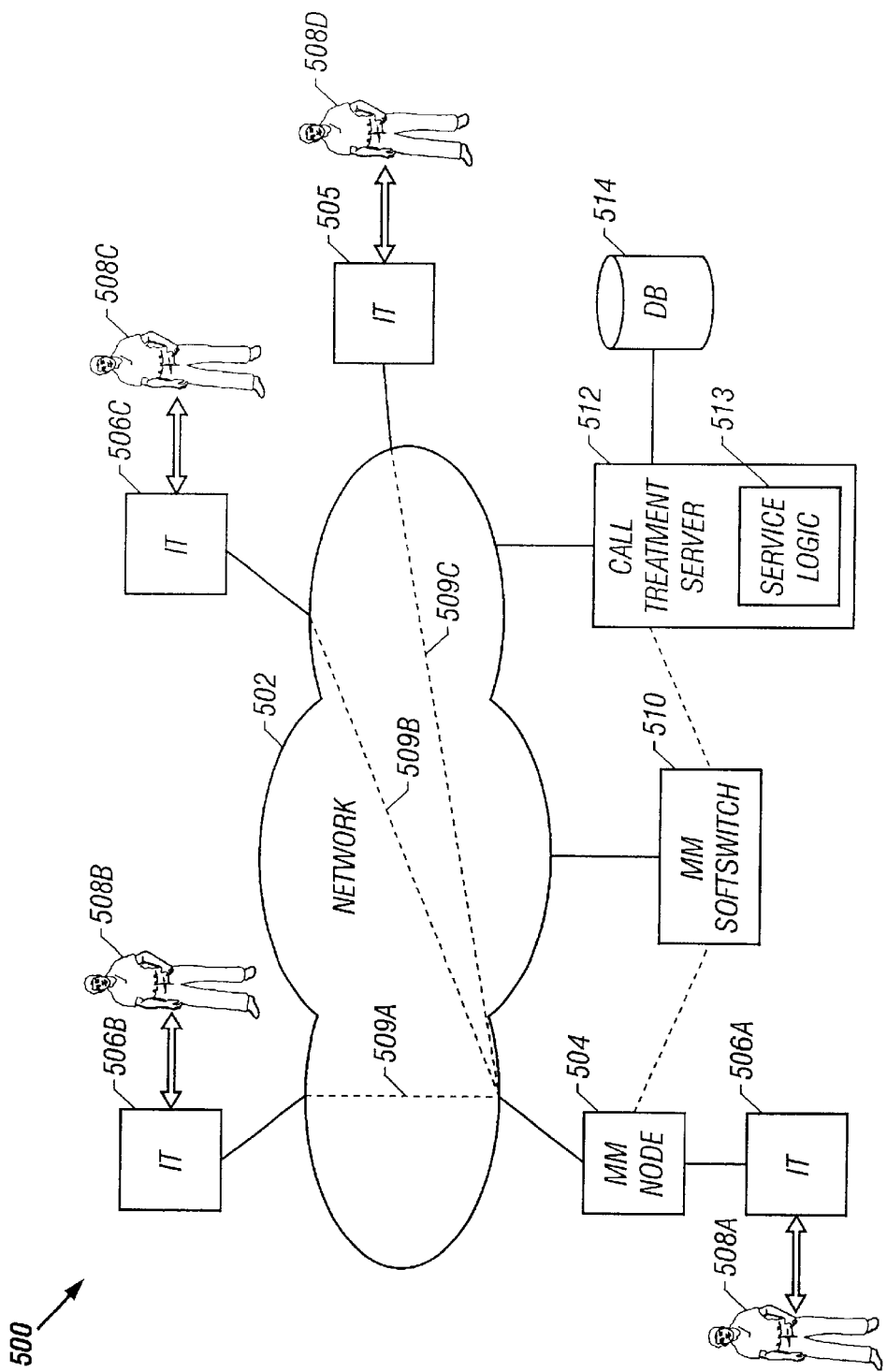
FIG. 5 depicts an exemplary service network which employs a multimedia call treatment system and method in accordance with the teachings of the present invention for providing an enhanced call waiting service.

Referring now to FIG. 5, depicted therein is an exemplary service network arrangement 500 which employs a multimedia call treatment system and method in accordance with the teachings of the present invention for providing an enhanced call waiting service in a multimedia-capable next-generation network 502. It should be appreciated by those skilled in the art upon reference hereto that in one embodiment, the network 502 may be comprised of a combination of various PSN and CSN portions and their hybrids, including local and inter-carrier network portions. A multimedia node or network element 504 is operable to serve a plurality of subscribers, e.g., subscriber 508A operating a multimedia IT device 506A for originating and/or terminating calls. Similarly, other subscribers operating suitable ITs, e.g., subscriber 508B with IT 506B and subscriber 508C with IT 506C, are also operably coupled to the network 502.

A softswitch 510 having the multimedia call/session engine functionality as described hereinabove is disposed in the network 502 for call routing and application triggering. Although the softswitch 510 is illustrated as a separate node in this embodiment, it should be recognized that the softswitch functionality may also be provided as part of the serving multimedia node 504. A call treatment server 512 is provided as an application server node coupled to the network 502, wherein suitable multimedia service logic 513 is provided for querying a subscriber profile database. Again, as alluded to hereinabove, it should be apparent that the functionality of the call treatment server node 512 may be distributed or embedded, depending upon the service architecture and application layering.

Continuing to refer to FIG. 5, the call treatment system of the present invention includes a database environment 514 associated with the call treatment server node 512 via a suitable interface. Various calling party and called party ID information, call notification information, multimedia call treatment criteria, other subscriber features, profiles and policies, etc. are stored in the database environment 514. In a presently preferred exemplary embodiment of the present invention, the database environment 514 is capable of being updated by the subscribers as well as the network operator. Additional information regarding the presentation of call party ID/profile information and distinctive call notification is provided in the following co-pending U.S. patent applications which have been cross-referenced and incorporated by reference hereinabove: (i) "Distinctive Call Notification Service In A Multimedia-Capable Network," filed May 31, 2001, Ser. No.: 09/871,079, in the name(s) of: Babu V. Mani; and (ii) "Call Party Profile Presentation Service In A Multimedia-Capable Network," filed May 31, 2001, Ser. No.: 09/871,410, in the name(s) of: Babu V. Mani.

Reference numeral 509A refers to an established call connection effectuated in the network 502 between subscriber 508A being served by the multimedia network element 504 and another calling party, e.g., subscriber 508B. Reference numeral 509B refers to another call, connection effectuated between subscriber 508A and at least another calling party, e.g., subscriber 508C, attempting to place a call to the first subscriber 508A while the established call connection is in progress. Reference numeral 509C refers to yet another call connection between subscriber 508A and a non-subscriber calling party 508D, also attempting to place a call to subscriber 508A while the established call connection 509A is in progress. Further, terminal 505 operated by calling party 508D may or may not be multimedia-compatible. As will be set forth in greater detail hereinbelow, the call treatment functionality of the network 502 is capable of providing multiple call waiting options to the first subscriber via a multimedia man/machine interface available in association with IT 506A.

Figure 6:
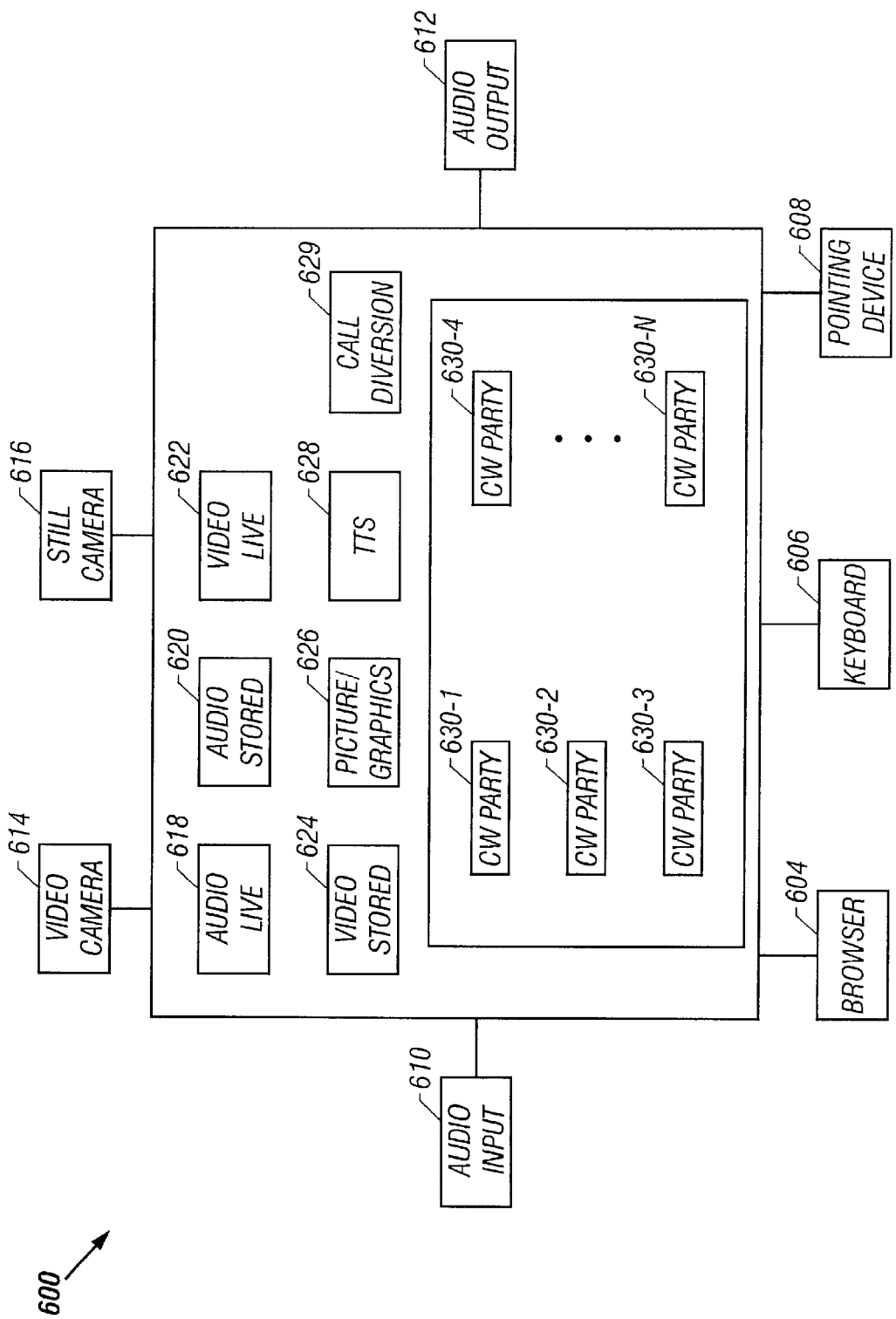
FIG. 6 depicts an exemplary multimedia interface with browser navigation for effectuating multimedia responses in accordance with the teachings of the present invention.

FIG. 6 depicts an exemplary multimedia interface 600 with browser navigation capability for effectuating multimedia responses by a subscriber with respect to incoming calls while a call is currently engaged. A display 602 is operable to present a graphic user interface (GUI) with a plurality of call-oriented icons which can be activated via drag-and-drop interaction under the control of a browser client 604 running on a multimedia terminal, e.g., IT 506A depicted in FIG. 5. A keyboard 606 and a cursor pointing device 608 (such as, e.g., a mouse or trackball, and their equivalents) are provided for facilitating the drag-and-drop interaction between the subscriber and the interface. Suitable audio input devices 610 and audio output devices 612 are associated with the interface 600 for effectuating live speech responses. A digital video camera 614 and a still camera 616 are also included for capturing live video and still photographs of the subscriber in order to provide live images as multimedia responses to various waiting callers in queue.

Depending on call waiting (CW) notification features available to the subscriber, the plurality of waiting callers may be presented on the display 602 as suitable "icons", e.g., CW Party 630-1 through 630-N. It should be recognized that these icons may comprise audio clip icons, image icons, animation graphics, flashing text messages, et cetera, associated with the waiting callers.

The exemplary multimedia interface 600 also includes a plurality of response icons based on the different call treatment options supported in the subscriber's call waiting service. An Audio Live icon 618 is operable, when selected, to enable the subscriber to engage in a live speech response to a waiting caller. Similarly, Audio Stored icon 620 is available for providing a multimedia response that includes a stored audio clip to be transmitted to the calling party. Video Live icon 622 and Video Stored 624 are operable to facilitate the transmission of live video and stored video images, respectively. An exemplary Picture/Graphics icon 626 is provided for transmitting animation images, still photographic images, live or stored, and the like. A TTS icon 628 is operable, when activated, to convert text messages to speech and vice versa. Also, a Call Diversion icon 629 is provided so as to enable the subscriber to divert the incoming call to a voice mail box, answering service, or a different terminal, etc.

Figure 7:
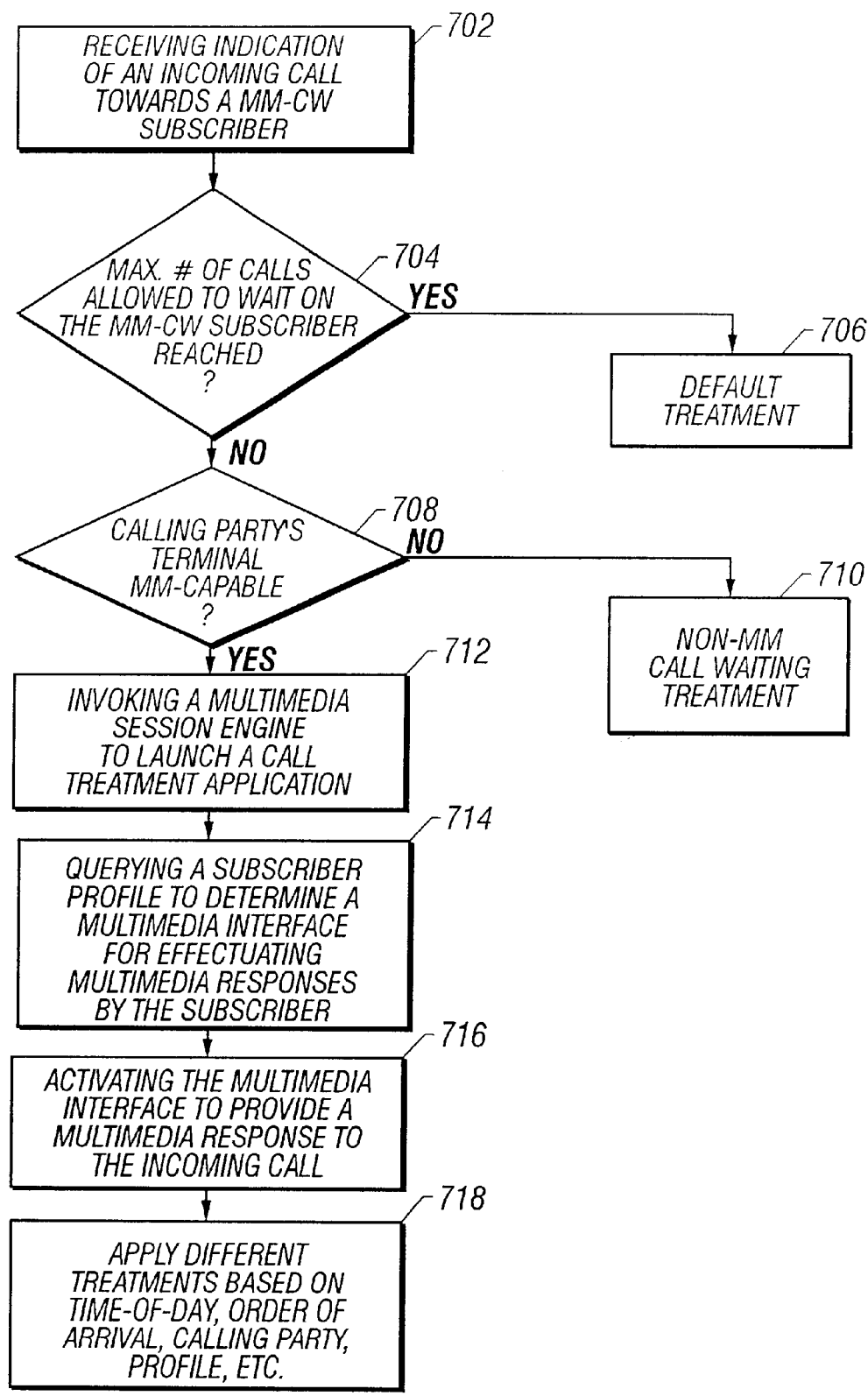
FIG. 7 is a flow chart of the steps involved in an exemplary call treatment method for providing the enhanced call waiting service of the present invention.

Referring now to FIG. 7, depicted therein is a flow chart of the steps involved in an exemplary call treatment method for providing the multimedia-enhanced call waiting (MM-CW) service in accordance with the teachings of the present invention. Upon receiving an indication at a network element serving a MM-CW subscriber currently engaged in an established call connection with a party that an incoming call is being directed towards the MM-CW subscriber from at least one calling party (step 702), wherein the parties may or may not be MM-CW subscribers themselves, a determination is made to verify if the number of calls allowed to wait on the subscriber has reached a predetermined threshold (decision block 704). If so, a predetermined default treatment, such as call diversion, voice mail, etc., may be provided to the incoming call (step 706). A further determination is made with respect to the calling party's profile and/or calling party's terminal capabilities (decision block 708). If the calling party's terminal is not a multimedia-capable terminal, a default CW treatment specific to non-MM terminals may be provided (step 710).

If the calling party is attempting to reach the subscriber using a terminal with requisite MM capabilities, a multimedia call/session engine is invoked to launch a MM call treatment application for the subscriber (step 712). Thereafter, the call treatment application is operable to query a subscriber profile to determine a multimedia interface to be presented to the subscriber for effectuating a response to the incoming call (step 714).

As set forth hereinabove, the multimedia interface includes browser-based navigation capability to select different response options. The subscriber activates one of the response options without disrupting the established call connection to provide a suitable multimedia response to the incoming call, which includes audio, video, graphics, text, TTS, and the like (step 716). Different call treatments may be applied based on various parameters associated with the incoming call, e.g., time-of-day, order of arrival, select call waiting list, etc., in addition to the calling party profile, if available to the subscriber (step 718). In other exemplary embodiments, the network element serving the subscriber is operable to query the calling party's serving node to obtain such ID/profile information.

Further, different treatments can be specified for the first waiting call, the second waiting call, and so on, or for the first pre-specified number of calls (e.g., five calls), second pre-specified number of calls, et cetera. Various combinations may therefore be had for according appropriate call treatments with respect to the waiting calls. A yet further exemplary embodiment involves providing different call treatments based on a selective list, i.e., if a call originates from a geographic location (a local region, area code, or a country), or based on explicitly stated calling party IDs. Additionally, call treatment may also be based on: (i) directly terminating calls vs. forwarded calls or transferred calls, (ii) calling party profile known vs. no calling party profile presented, (iii) calling party is known vs. unknown calling party.

Thus, it should be appreciated by those skilled in the art that the call treatment scenarios in accordance with the MM-CW service of the present invention may be based on a number of parameters, preferences, privileges, policies, etc. Preferably, the subscriber is allowed to specify his/her service profile by setting these data. The specific call treatment is consequently determined by the system based on the subscriber profile and the terminal capabilities at the other end.

An exemplary call waiting service scenario in accordance with the teachings of the present invention is as follows. Parties A and B are engaged in a phone conversation or Party A is on the Internet. Party C calls Party A, who is notified of the incoming call via a flashing message. Without disrupting the conversation between Parties A and B, Party A responds to Party C by clicking a button. In response, Party C greets Party A. The greeting is converted to text and presented to Party A, who selects an audio clip to be played to Party C. Again, Party C's response is presented as text to Party A. At this point, Party A may decide either to engage Party C in a live audio conversation or may divert the call.

Based upon the foregoing Detailed Description, it should be readily apparent that the present invention advantageously provides an enhanced call waiting service using multimedia within the context of a next-generation network. By architecting the service as part of a decoupled application layer with open protocols and APIs, not only can service interoperability with different network elements and platforms be ensured, but service rollout can be streamlined for faster delivery. Furthermore, the call waiting service of the present invention provides several advancements and improvements over the conventional call waiting schemes. First, the percentage of calls completed is increased significantly because of the different call notification mechanisms which enable the called party to positively discriminate in favor of "high priority" calls from parents, close relatives, and select third parties. Second, by applying the multimedia capability in a seamless integration with the voice-only call waiting service, a superior communication experience is provided to the subscribers. Also, from the network operators' standpoint, multiple service/feature options associated with the multimedia capability give rise to diversified revenue models with increased profit margins.

In addition, the need for some of the existing services relating to Call Waiting may be obviated in the practice of the present invention. For example, conventional Cancel Call Waiting is not needed since no call waiting will occur if the number of calls to wait for a subscriber is set to zero.

It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, the teachings of the present invention can also be utilized advantageously in a service application where a subscriber is to respond to multiple calling parties at the same time on an individual basis or a group basis. The present invention may also be practiced where a human operator is to answer calls (e.g., a call center) and divert them to selected locations. It is further possible to place machine intelligence (preferably capable of ASR) in conjunction with multimedia terminals to engage in initial sessions with calling parties and to dispatch calls. Also, those skilled in the art should appreciate upon reference hereto that the multimedia capabilities enable personalized chat sessions with calling parties, wherein the called party can select the manner how the incoming calls are to be presented and the responses thereto. In addition, multiple "conference bridges" can be advantageously implemented among the parties, where the subscriber is able to participate in different conferences on a selective basis. As a further alternative, the subscriber may be designated a "supervisor" whereby the subscriber is capable of monitoring any of the "calls" dispatched to the remaining parties, or agents. Accordingly, all such modifications, alterations, combinations, amendments, and the like should be deemed to be within the ambit of the present invention whose scope is defined solely by the claims set forth immediately hereinbelow.

What is claimed is:

1. A call treatment method for use in a multimedia-capable network, comprising the steps:

receiving, at a network element serving a subscriber currently engaged in an established call connection with a party, an indication that an incoming call is being directed towards said subscriber from at least one calling party;

responsive to the step of receiving said indication, invoking by said network element a multimedia session engine to launch a call treatment application for said subscriber;

querying a subscriber profile by said call treatment application to determine a multimedia interface to be presented to said subscriber for effectuating a response to said incoming call; and activating by said subscriber, without disrupting said established call connection, at least a portion of said multimedia interface to provide a response to said incoming call.

2. The call treatment method for use in a multimedia-capable network as set forth in claim 1, further comprising the steps:

determining if the number of calls allowed to wait on said subscriber has reached a predetermined threshold; and if so, providing a predetermined default treatment with respect to said incoming call.

3. The call treatment method for use in a multimedia-capable network as set forth in claim 2, further comprising the step of determining if said incoming call is effectuated from a multimedia-capable terminal, and if so, providing said response to said incoming call using a multimedia response.

4. The call treatment method for use in a multimedia-capable network as set forth in claim 3, wherein said multimedia interface includes a plurality of software buttons activatable by a browser program for effectuating a drag-and-drop interaction with said subscriber as part of providing said multimedia response to said incoming call.

5. The call treatment method for use in a multimedia-capable network as set forth in claim 4, wherein said multimedia response from said first subscriber comprises transmitting a stored audio clip towards said at least one calling party.

6. The call treatment method for use in a multimedia-capable network as set forth in claim 4, wherein said multimedia response from said subscriber comprises transmitting a live audio clip towards said at least one calling party.

7. The call treatment method for use in a multimedia-capable network as set forth in claim 4, wherein said multimedia response from said subscriber comprises transmitting at least one of a stored video clip and a stored still photo towards said at least one calling party.

8. The call treatment method for use in a multimedia-capable network as set forth in claim 4, wherein said multimedia response from said subscriber comprises transmitting at least one of a live video clip and a live still photo towards said at least one calling party.

9. The call treatment method for use in a multimedia-capable network as set forth in claim 4, wherein said multimedia response from said subscriber comprises transmitting a text message towards said at least one calling party.

10. The call treatment method for use in a multimedia-capable network as set forth in claim 4, wherein said multimedia response from said subscriber is dependent on a calling party profile associated with said at least one calling party.

11. The call treatment method for use in a multimedia-capable network as set forth in claim 4, wherein said multimedia response from said subscriber is dependent on a time-of-day parameter associated with said incoming call.

12. The call treatment method for use in a multimedia-capable network as set forth in claim 4, wherein said multimedia response from said subscriber is dependent on an order of arrival parameter associated with said incoming call.

13. A call treatment system for use in a multimedia-capable network, comprising:

a network element for serving a subscriber currently engaged in an established call connection with a party, said network element operating to receive an indication that an incoming call is being directed to said subscriber from at least one calling party;

a multimedia session engine associated with said network element operable to launch a call treatment application for said subscriber responsive to said indication;

logic means associated with said call treatment application for querying a subscriber profile to determine a multimedia interface to be presented to said subscriber for effectuating a response to said incoming call; and means for activating by said subscriber, without disrupting said established call connection, at least a portion of said multimedia interface to provide a multimedia response to said incoming call.

14. The call treatment system for use in a multimedia-capable network as set forth in claim 13, wherein said multimedia interface includes a plurality of software buttons activatable by a browser program for effectuating a drag-and-drop interaction with said subscriber as part of providing said multimedia response to said incoming call.

15. The call treatment system for use in a multimedia-capable network as set forth in claim 14, wherein said multimedia response from said subscriber comprises transmitting towards said at least one calling party at least one of a stored audio clip, a live audio clip, a stored video clip, a stored still photo, a live video clip, a live still photo, and a text message.

16. The call treatment system for use in a multimedia-capable network as set forth in claim 14, wherein said multimedia response from said subscriber is dependent on a service profile associated with said at least one calling party.

17. The call treatment system for use in a multimedia-capable network as set forth in claim 14, wherein said multimedia response from said subscriber is dependent on a time-of-day parameter associated with said incoming call.

18. The call treatment system for use in a multimedia-capable network as set forth in claim 14, wherein said multimedia response from said subscriber is dependent on an order of arrival parameter associated with said incoming call.

19. A computer-accessible medium operable with a network element disposed in a multimedia-capable next-generation network, said computer-accessible medium carrying a sequence of instructions which, when executed by at least one processing entity associated with said multimedia-capable next-generation network, cause the following steps to be performed:

upon receiving, at said network element serving a subscriber currently engaged in an established call connection with a party, an indication that an incoming call is being directed towards said subscriber from at least one calling party, invoking by said network element a multimedia session engine to launch a call treatment application for said subscriber;

querying a subscriber profile by said call treatment application to determine a multimedia interface to be presented to said subscriber for effectuating a response to said incoming call; and activating by said subscriber, without disrupting said established call connection, at least a portion of said multimedia interface to provide a multimedia response to said incoming call.

20. The computer-accessible medium operable with a network element disposed in a multimedia-capable next-generation network as set forth in claim 19, wherein said multimedia interface includes a plurality of software buttons activatable by a browser program for effectuating a drag-and-drop interaction with said subscriber as part of providing said multimedia response to said incoming call.

21. The computer-accessible medium operable with a network element disposed in a multimedia-capable next-generation network as set forth in claim 20, wherein said multimedia response from said subscriber comprises transmitting towards said at least one calling party at least one of a stored audio clip, a live audio clip, a stored video clip, a stored still photo, a live video clip, a live still photo, and a text message.

22. The computer-accessible medium operable with a network element disposed in a multimedia-capable next-generation network as set forth in claim 20, wherein said multimedia response from said subscriber is dependent on a calling party profile associated with said at least another calling party.

23. The computer-accessible medium operable with a network element disposed in a multimedia-capable next-generation network as set forth in claim 20, wherein said multimedia response from said subscriber is dependent on a time-of-day parameter associated with said incoming call.

24. The computer-accessible medium operable with a network element disposed in a multimedia-capable next-generation network as set forth in claim 20, wherein said multimedia response from said subscriber is dependent on an order of arrival parameter associated with said incoming call.

* * * * *